United States Patent [19]
Kondo et al.

[11] Patent Number: 5,662,549
[45] Date of Patent: Sep. 2, 1997

[54] CONTROL SYSTEM FOR AUTOMATIC TRANSMISSION FOR VEHICLE

[75] Inventors: Noboru Kondo; Kenzo Nishida, both of Wako, Japan

[73] Assignee: Honda Giken Kogyo Kabushiki Kaisha, Tokyo, Japan

[21] Appl. No.: 594,450

[22] Filed: Jan. 31, 1996

[30] Foreign Application Priority Data

Feb. 6, 1995 [JP] Japan ................... 7-017639

[51] Int. Cl.⁶ ............... F16H 59/04; F16H 59/14; F16H 59/36; F16H 61/06
[52] U.S. Cl. ............... 477/122; 477/154; 477/155; 477/156; 477/159; 477/162; 477/163
[58] Field of Search ............... 477/122, 123, 477/154, 155, 156, 159, 162, 163, 902

[56] References Cited

U.S. PATENT DOCUMENTS

| | | |
|---|---|---|
| 3,718,056 | 2/1973 | Felder et al. ............... 477/155 |
| 4,046,032 | 9/1977 | Braun et al. ............... 477/122 |
| 4,365,526 | 12/1982 | Suga . |
| 4,790,217 | 12/1988 | Kawano . |
| 4,876,923 | 10/1989 | Crandall . |
| 4,913,004 | 4/1990 | Panoushek et al. ............... 477/155 |
| 4,955,259 | 9/1990 | Narita ............... 477/163 X |
| 5,351,570 | 10/1994 | Mizunuma et al. ............... 477/122 X |

FOREIGN PATENT DOCUMENTS

| | | |
|---|---|---|
| 0 072 631 | 2/1983 | European Pat. Off. . |
| 59-37359 | 2/1984 | Japan . |
| 2-8545 | 1/1990 | Japan . |
| 2-125174 | 5/1990 | Japan . |

*Primary Examiner*—Charles A. Marmor
*Assistant Examiner*—Nathan O. Jensen
*Attorney, Agent, or Firm*—Armstrong, Westerman, Hattori, McLeland & Naughton

[57] ABSTRACT

A control system for an automatic transmission for a vehicle provides an enhancement in a shifting characteristic in a manually shifting mode by controlling an operating hydraulic pressure for hydraulic engage elements in an appropriate manner. In a first range from the output of a shifting command to a time point when a timer TOIPU reaches a counting-up value, or a time point when the slip rate ECL of the hydraulic engage elements exceeds a value YECLIPUS, the operating hydraulic pressure is set at a preset value depending upon the type of shifting. In a second range from the end of the first range to a time point when the timer TOIPU reaches a counting-up value, or a time point when a slip rate ECL exceeds a value TECLIPUS, and in a third range from the end of the second range to a time point when a timer TKAK reaches a counting-up value, the operating hydraulic pressure QAT is set at a value corresponding to an engine torque or a transmission input torque.

4 Claims, 11 Drawing Sheets

CONTROL SYSTEM FOR AUTOMATIC TRANSMISSION FOR VEHICLE

BACKGROUND OF THE INVENTION

1. Field of the Invention

The present invention relates to a control system for an automatic transmission for a vehicle, wherein a manual shifting can be carried out in addition to an automatic shifting based on a usual shifting map.

2. Description of the Related Art

There is a conventionally known automatic transmission designed so that an optimal gear shift stage is selected by searching a shifting map using, as parameters, detection values such as vehicle speed, engine load and the like, and an automatic shifting is conducted to establish such optimal gear shift stage. In such an automatic transmission, shifting characteristics are established on the basis of the general travel state of the vehicle. For this reason, the following problem is encountered: it is difficult to select the optimal gear shift stage in all travel states, and a throttle opening degree and an amount of accelerator pedal depression are detected, but eventually, the gear shift stage is uniformly selected. There are also conventionally known automatic transmissions in which a shifting characteristic emphasizing a power performance and a shifting characteristic emphasizing a specific fuel consumption can be selected. In any of these automatic transmissions, however, a shifting characteristic suitable for the driver's preference is rarely completely realized.

Therefore, automatic transmissions have been proposed which are designed so that any gear shift stage can be selected by operating a switch or a lever by a driver (see Japanese Patent Application Laid-open No. 37359/84, 8545/90 and 125174/90).

There are also conventionally known automatic transmissions designed so that the operating hydraulic pressure for the hydraulic engage elements in a transition period of shifting is controlled by a solenoid valve such as a linear solenoid and a duty solenoid, based on a previously established shifting characteristic and travel conditions such as a throttle opening degree and a vehicle speed (see Japanese Patent Application Laid-open No. 224553/89 and 215157/87).

The control Of the hydraulic pressure in the known technique is extremely effective, when the shifting is conducted based on the previously established shifting characteristics in the automatic shifting mode. However, when the manual shifting mode, in which the driver operates the switch or the lever to conduct the shifting as desired, has been established, the amount of data accommodating all shifting points is very large and hence, it is difficult to realize the control of the hydraulic pressure.

SUMMARY OF THE INVENTION

The present invention has been accomplished with the above circumstance in view, and it is an object of the present invention to provide an improvement in shifting characteristics in both of the manual and automatic shifting modes, or in the manual shifting mode by appropriately controlling the operating hydraulic pressure for the hydraulic engage elements.

To achieve the above object, according to the present invention, there is provided a control system for an automatic transmission for a vehicle, which is capable of selecting automatic and manual shifting modes, comprising a vehicle speed detecting means for detecting a value corresponding to a vehicle speed, an engine load detecting means for detecting a value corresponding to an engine load, an automatic shifting mode capable of controlling the transmission gear ratio based on outputs from said vehicle speed detecting means and said engine load detecting means, and a shifting characteristic which is previously established, a shifting command means adapted to output a shifting command for shifting to a predetermined gear ratio by a manual operation, a manual shifting mode for conducting a shifting by the operation of the shifting command means, a plurality of hydraulic engage elements for establishing a transmission gear ratio selected in each of the automatic shifting mode or the manual shifting mode, and a control means for controlling the hydraulic pressure of a working oil supplied to the hydraulic engage elements, wherein the control means establishes a hydraulic pressure of said working oil based on an engine output torque and a transmission input torque at the time of shifting in a state in which at least the manual shifting mode has been selected.

According to another feature of the present invention, there is provided a control system for an automatic transmission for a vehicle, which is capable of selecting automatic and manual shifting modes, comprising a vehicle speed detecting means for detecting a value corresponding to a vehicle speed, an engine load detecting means for detecting a value corresponding to an engine load, an automatic shifting mode capable of controlling the transmission gear ratio based on outputs from said vehicle speed detecting means and said engine load detecting means, and a shifting characteristic which is previously established, a shifting command means adapted to output a shifting command for shifting to a predetermined gear ratio by a manual operation, a manual shifting mode for conducting a shifting by the operation of the shifting command means, a plurality of hydraulic engage elements for establishing a transmission gear ratio selected in each of the automatic shifting mode or the manual shifting mode, and a control means for controlling the hydraulic pressure of a working oil supplied to the hydraulic engage elements, wherein the control means establishes a hydraulic pressure of said working oil based on a preset value at the time of shifting in a state in which the automatic shifting mode has been selected, and establishes a hydraulic pressure of said working oil based on an engine output torque and a transmission input torque at the time of shifting in a state in which the manual shifting mode has been selected.

In addition to the features described above, power-on upshifting occurs during the shifting.

With the features described above, the hydraulic pressure of the working oil for the hydraulic engage elements during the shifting is established based on the engine torque or the transmission input torque. Therefore, it is possible to alleviate the generation of a sudden increase in number of revolutions of the engine or a shifting shock caused by the shifting, thereby providing a good shifting characteristic.

BRIEF DESCRIPTION OF THE DRAWINGS

The present invention will current be described by way of embodiments with reference to the accompanying drawings.

DETAILED DESCRIPTION OF THE INVENTION

Figure 1:
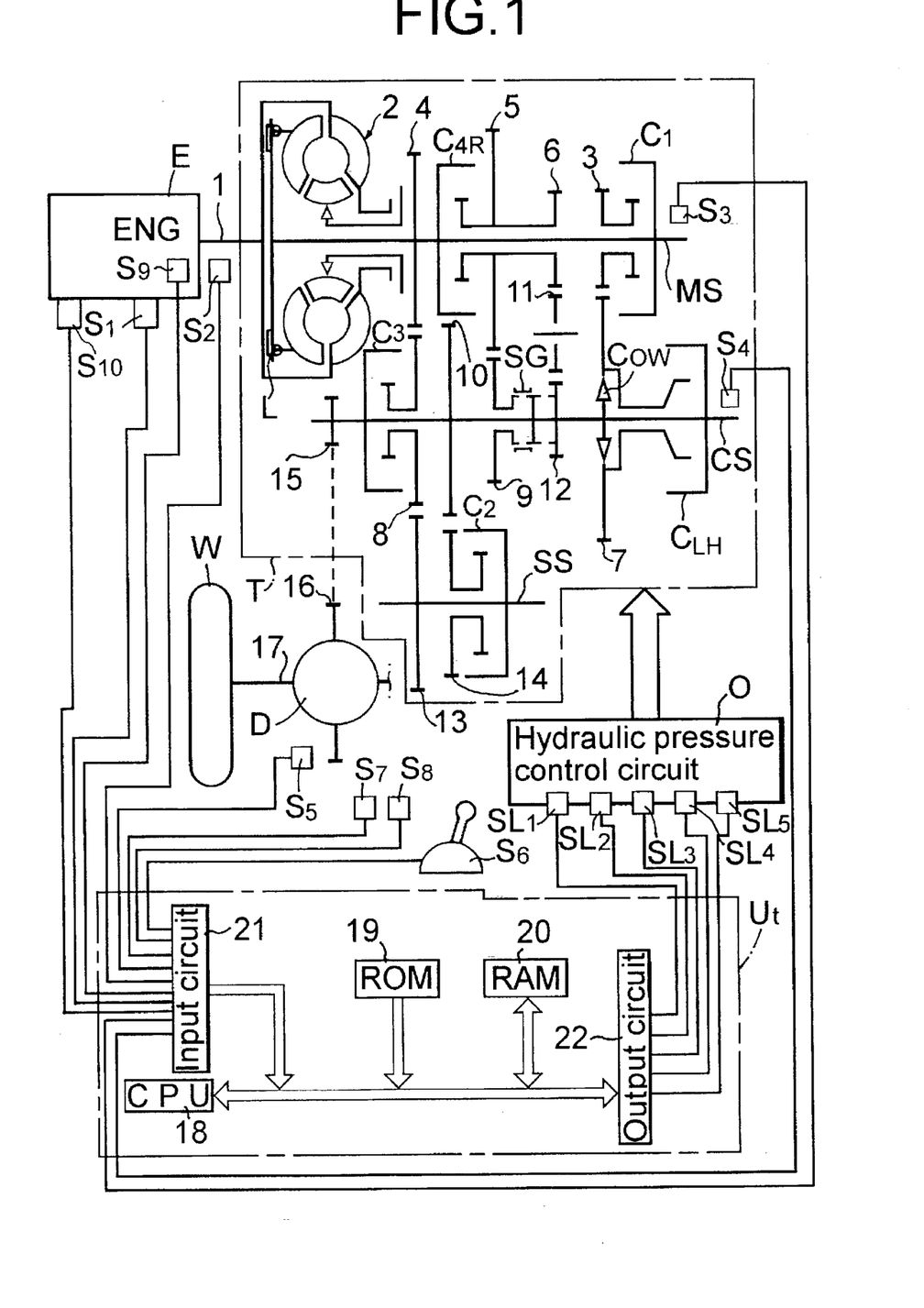
FIG. 1 is a schematic illustration of an automatic transmission for a vehicle and a control system therefor.

FIG. 1 shows a 7-position type automatic transmission for a vehicle in which it is possible to select any of the following seven ranges by the select lever: a "P" range, for parking, an "R" range, for reverse, an "N" range, for neutral, a "D" range, for a first- to fourth-shift automatically shiftable range, an "M" range for a first- to fourth-shift manually shiftable range, a "2" range, for a second-shift fixing range including a downshifting from a third gear shift stage to a second gear-shift stage, and a "1" range, for a first-shift fixing range including a downshifting from the second gear-shift stage to a first gear-shift stage.

The automatic transmission T, FIG. 1, includes a main shaft MS, connected to a crankshaft 1, of an engine E, through a torque converter 2, having a lock-up clutch L, and a counter shaft CS and a secondary shaft SS disposed parallel to the main shaft MS.

Carried on the main shaft MS are a main first-shift gear 3; a main second-shift/third-shift gear 4, a main fourth-shift gear 5 and a main reverse gear 6. Carried on the counter shaft CS are a counter first-shift gear 7 meshed with the main first-shift gear 3, a counter second-shift/third-shift gear 8 meshed with the main second-shift/third-shift gear 4, a counter fourth-shift gear 9 meshed with the main fourth-shift gear 5, a counter second-shift gear 10, and a counter reverse gear 12 connected to the main reverse gear 6 through a reverse idle gear 11. Carried on the secondary shaft SS are a first second-shift gear 13 meshed with the counter second-shift/third-shift gear 8, and a second secondary second-shift gear 14 meshed with the counter second-shift gear 10.

When the main first-gear 3, relatively rotatably carried on the main shaft MS, is coupled to the main shaft MS by a first-shift clutch $C_1$, a first gear-shift stage is established. The first-shift clutch $C_1$ is maintained in its engaged state even when any of second to fourth gear-shift stages is established, and hence, the counter first-shift gear 7 is supported through a one-way clutch $C_{ow}$. When the second secondary second-shift gear 14, relatively rotatably carried on the secondary shaft SS, is coupled to the secondary shaft SS, by a second-shift clutch $C_2$, a second gear-shift stage is established. When the counter second-shift/third-shift gear 8, relatively rotatably carried on the counter shaft CS, is coupled to the counter shaft CS by a third-shift clutch $C_3$, a third gear-shift stage is established. Clutches $C_1$–$C_4$ are hydraulic engage elements.

When the main fourth-shift gear 5, relatively rotatably carried on the main shaft MS, is coupled to the main shaft MS by a fourth-shift/reverse clutch $C_{4r}$, in a condition in which the counter fourth-shift gear 9, relatively rotatably carried on the counter shaft CS, has been coupled to the counter shaft CS by a select gear SG, a fourth gear shift stage is established. When the main reverse gear 6, relatively rotatably carried on the main shaft MS, is coupled to the main shaft MS by a fourth-shift/reverse clutch $C_{4r}$, in a condition in which the counter reverse gear 12, relatively rotatably carried on the counter shaft CS, has been coupled to the counter shaft CS by the select gear SG, a backward gear-shift stage is established.

The rotation of the counter shaft CS is transmitted, through a final drive gear 15 and a final driven gear 16, to a differential D and then, from the differential D, through left and right axles 17, to driven wheels W.

Further, when the counter first-shift gear 7 is coupled to the counter shaft CS, by the first-shift holding clutch $C_{LH}$, in a condition in which the first-shift clutch $C_1$ has been brought in to its engaged state, a first-shift holding gear shift stage is established. If the first-shift holding gear shift stage is established, when an engine brake is required, the torque of the driven wheels W can be transmitted back to the engine E, even if the one-way clutch $C_{OW}$ is slipped.

An electronic control unit Ut, for controlling the automatic transmission T, includes CPU 18, ROM 19, RAM 20, an input circuit 21 and an output circuit 22.

Supplied to the input circuit 21 of the electronic control unit Ut are: a throttle opening degree TH detected by a throttle opening degree sensor (for detecting engine load) $S_1$ mounted on the engine E; a number of revolution Ne of the engine detected by a throttle opening degree sensor $S_2$ mounted on the engine E; a main shift-revolution-number Nm detected by a main shift-revolution-number sensor $S_3$ mounted on a main shaft MS; a counter shaft revolution-number Nc detected by a counter shaft revolution-number sensor $S_4$ mounted on a counter shaft CS; a vehicle speed V detected by a vehicle speed sensor $S_5$ mounted on the differential D; a select lever position P detected by a select lever position sensor $S_6$; a signal from an upshifting switch $S_7$ which will be described hereinafter; a signal from a downshifting switch $S_8$ which will be described hereinafter; a cooling water temperature Tw detected by a water temperature sensor $S_9$ mounted in the engine E; and an intake pipe negative pressure Pb detected by an intake pipe negative pressure sensor $S_{10}$ mounted in the engine E.

The output circuit 22, of the electronic control unit Ut, is connected to five solenoids $SL_1$, $SL_2$, $SL_3$, $SL_4$ and $SL_5$, mounted in a hydraulic pressure control circuit 0, to control the operations of the first-shift clutch $C_1$, the second-shift clutch $C_2$, the third-shift clutch $C_3$, the fourth-shift/reverse clutch $C_{4r}$, the first-shift holding clutch $C_{LH}$, the selector gear SG and the lock-up clutch L. The solenoid $SL_1$ governs the turning ON and OFF of the lock-up clutch L. The solenoid $SL_2$ governs the control of the capacity of the lock-up clutch L. The solenoids $SL_3$ and $SL_4$ govern the turning ON and OFF of the first-shift clutch $C_1$, the second-shift clutch $C_2$, the third-shift clutch $C_3$, the fourth-shift/reverse clutch $C_{4r}$ and the first-shift holding clutch $C_{LH}$, as well as the operation of the selector gear SG. The solenoid $SL_5$ governs the control of the clutch hydraulic pressure.

Figure 2:
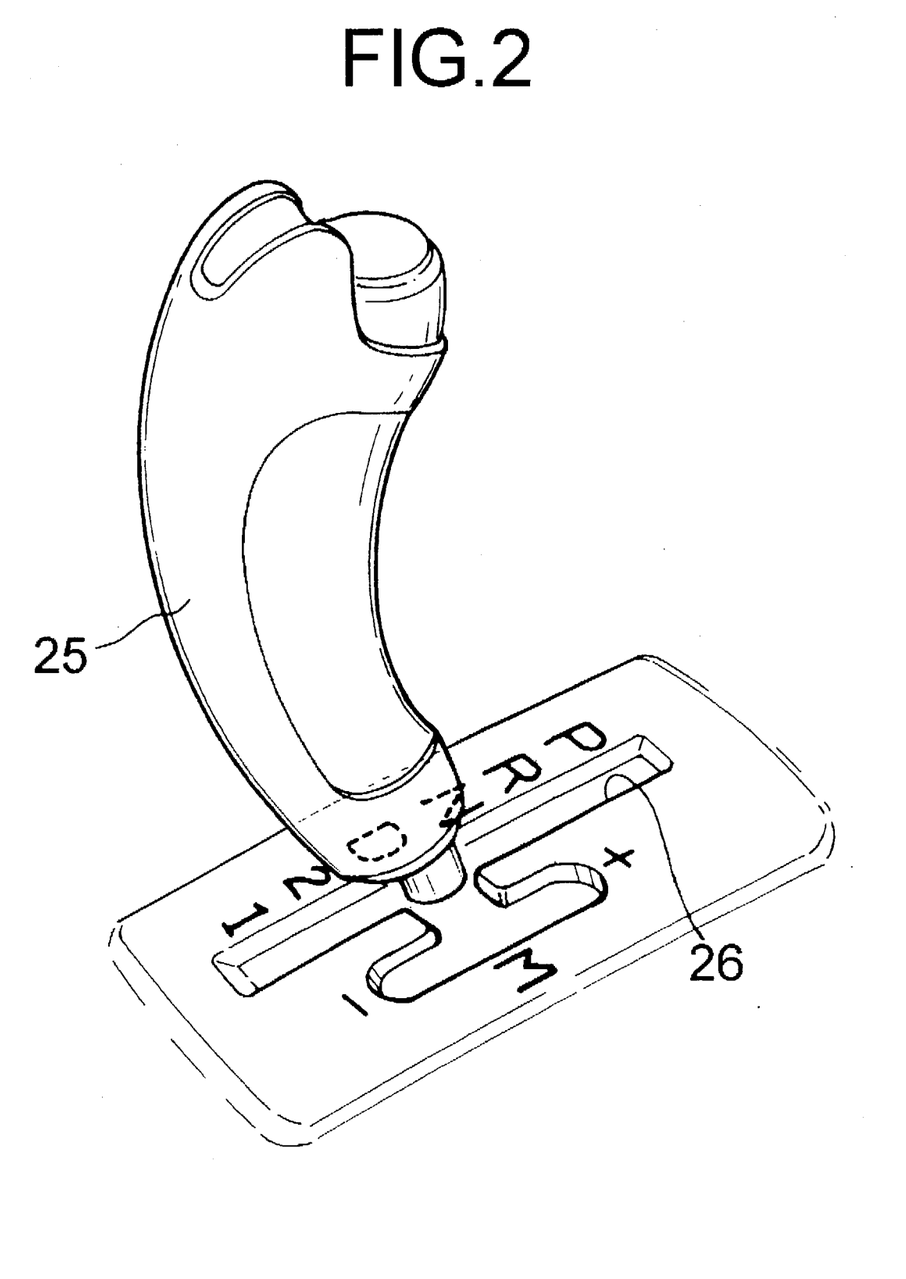
FIG. 2 is a perspective view of a select lever used along with a manual shift lever.

As shown in FIG. 2, the ranges selected by the select lever 25, include the "M" range (the first- to fourth-shift manually shiftable range) in addition to the usual "P", "R", "N", "D", "2" and "1" ranges. A guide groove 26, for guiding the select lever 25, is formed into a substantially H shape. A position, to which the select lever 25 is tilted rightwardly from the "D" range, is the "M" range, where the select lever 25 is tiltable longitudinally. If the select lever 25 is tilted forwardly (in a plus direction) in the "M" range, the upshifting switch $S_7$ is operated, to output an upshifting command. On the other hand, if the select lever 25 is tilted rearwardly (in a minus direction), the downshifting switch $S_8$ is operated to output a downshifting command.

Figure 3:
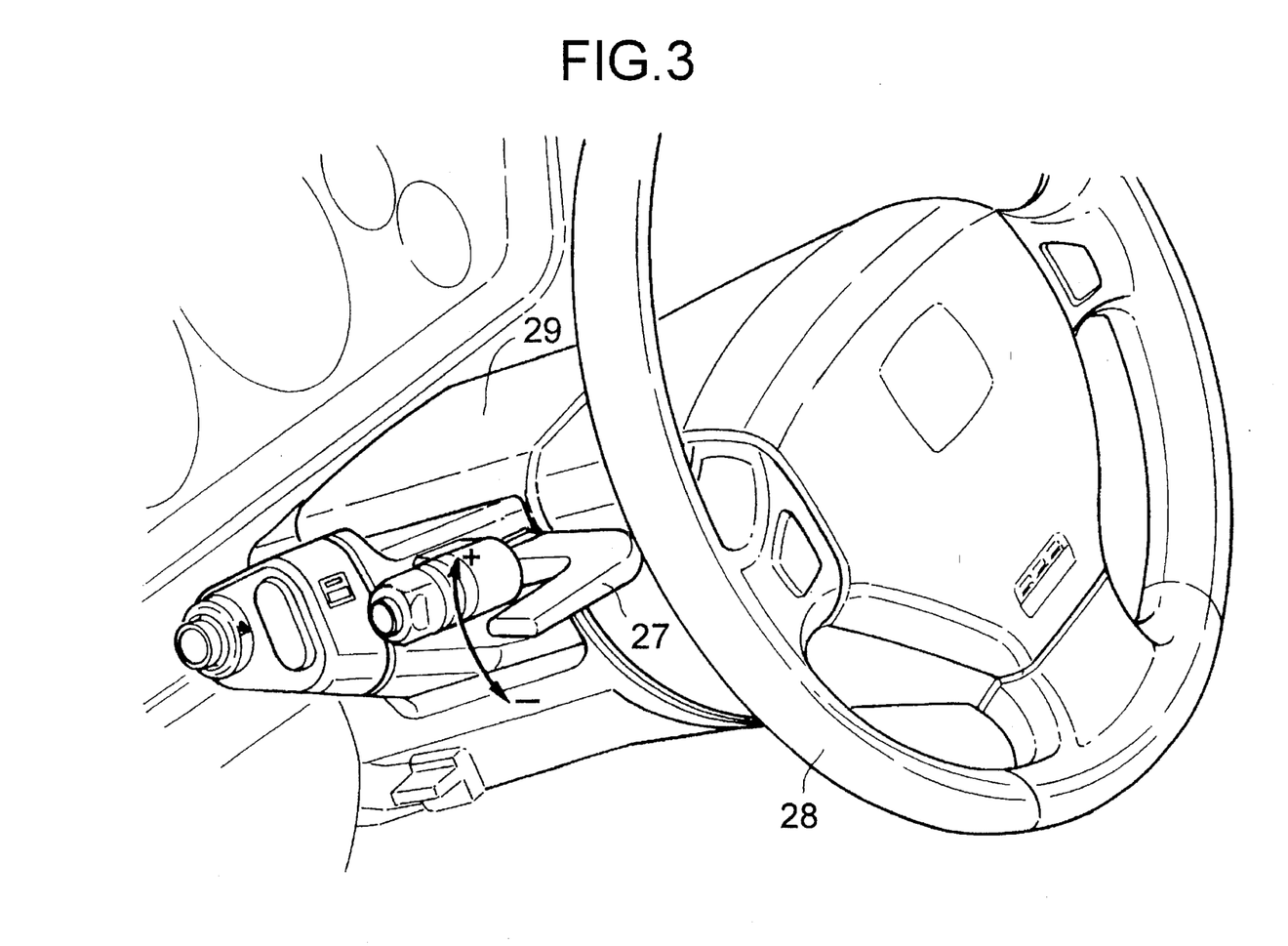
FIG. 3 is a perspective view of the manual shift lever mounted on a steering column.

FIG. 3 shows a manual shift lever 27, mounted independently from the select lever 25. The manual shift lever 27 is vertically swingably mounted on a left side of a steering column 29, which supports a steering wheel 28. The select lever 25 (not shown) has the "M" range between the "D" and "2" ranges. If the manual shift lever 27 is tilted upwardly (in the plus direction) in a condition in which the "M" range has been selected by the select lever 25, the upshifting switch $S_7$ is operated to output the upshifting command. On the other hand, if the manual shift lever 27 is tilted downwardly (in the minus direction), the downshifting switch $S_8$ is operated to output the downshifting command. Select lever 25 and manual select lever 27 are shifting command means.

Figure 4:
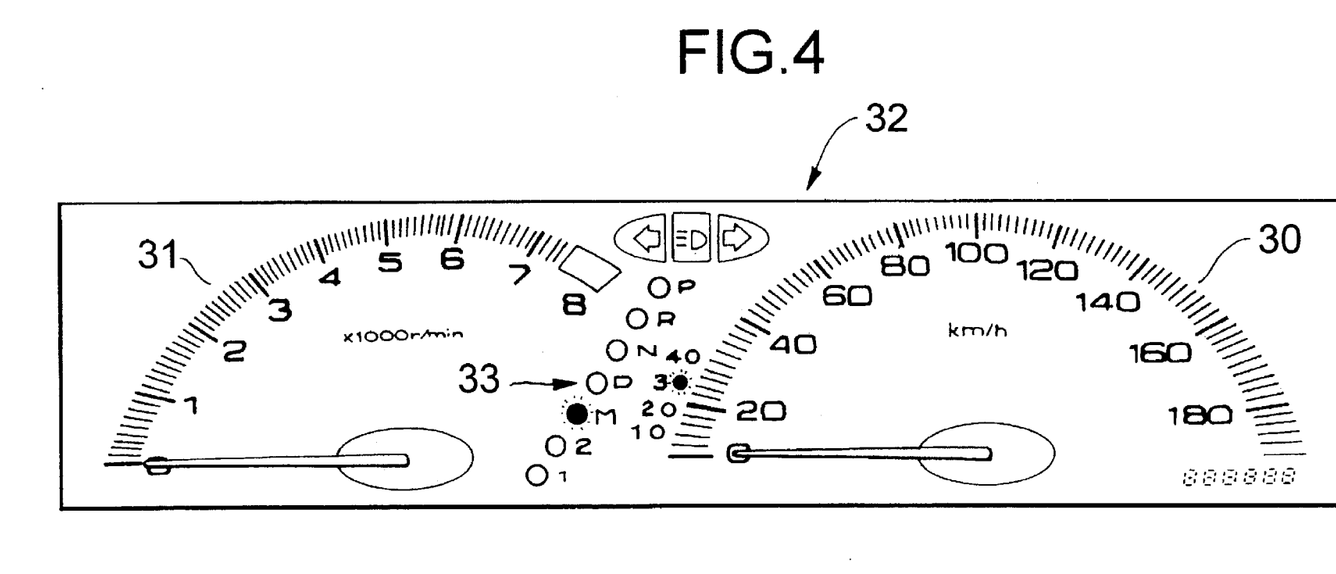
FIG. 4 is an illustration of an indicator for selected positions and gear shift stages.

A range selected by he select lever 25, FIG. 2, is indicated by an indicator 33, FIG. 4, which is mounted on a meter panel 32 including a speedometer 30 and a tachometer 31, as shown in FIG. 4. When the "M" range is selected, the gear shift stage currently established is indicated by the indicator 33. Alternatively, a range selected by the select lever 25 may be indicated on an indicator 33, provided in a tachometer 31, or the like, as shown in FIG. 5, and when the "M" range is selected, the gear shift stage, currently established, is indicated on the indicator 33.

Figure 5:
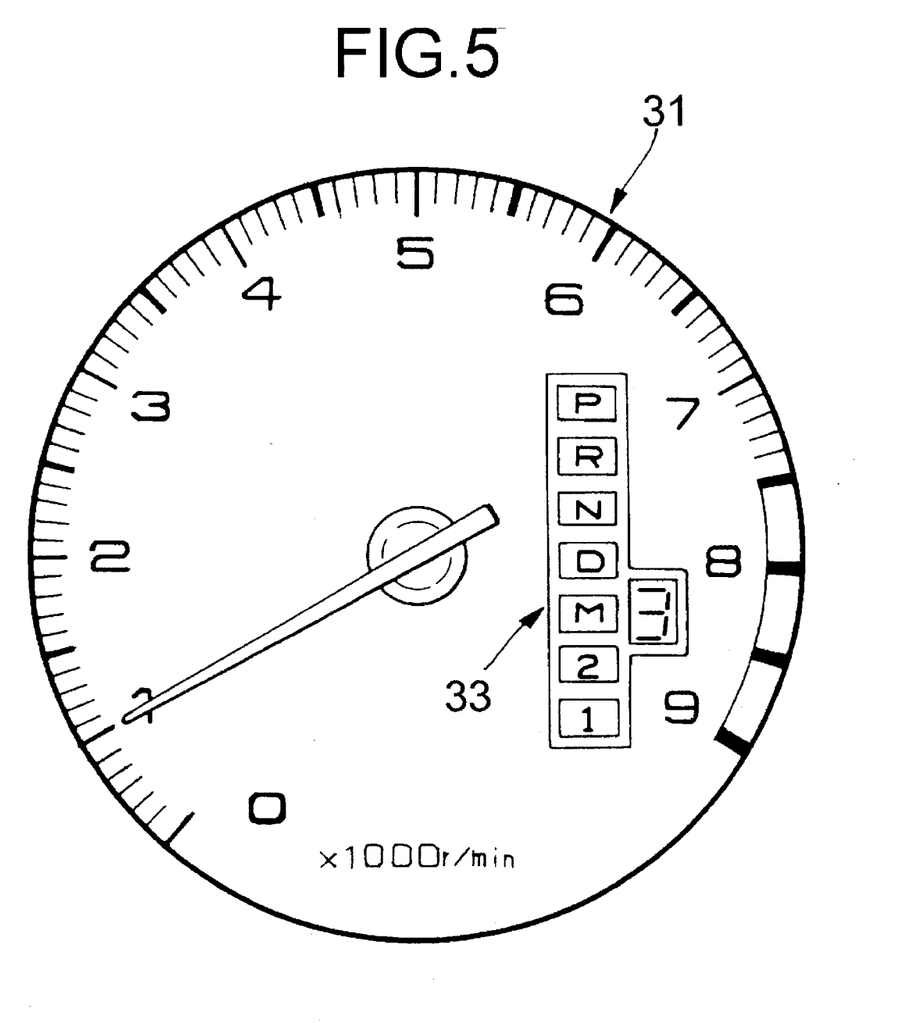
FIG. 5 is an illustration of another example of an indicator for selected positions and gear shift stages.

In FIGS. 4 and 5, if the indication of the gear shift stage, currently established, is flashed, the visual recognizability is further enhanced. In place of indicating the first-shift to fourth-shift gear shift stages by numerals 1 to 4, respectively, the gear ratio in each of these gear shift stages may be indicated.

When the "D" range has been selected, by the select lever 25, the upshifting and downshifting, between the first-shift to fourth-shift gear shift stages, are automatically carried out based on a shift map using, as parameters, the vehicle speed V, detected by the vehicle speed sensor $S_5$ and the throttle opening degree TH, detected by the throttle opening degree sensor $S_1$. When the "2" range is selected, the second gear shift stage is established. However, if the vehicle speed provided upon selection of the "2" range is large, so that an over revolution occurs in the second gear shift stage, the third gear shift stage is first established, and after the vehicle speed is reduced, the third gear shift stage is downshifted to the second gear shift stage which is then fixed. Similarly, if the vehicle speed provided upon selection of the "1" range is large, so that an over revolution occurs in the first-shift holding gear shift stage, the second gear shift stage is first established, and after the vehicle speed is reduced, the second gear shift stage is downshifted to the first-shift holding gear shift stage which is then fixed.

When the range has been switched over from the "D" range to the "M" range, if the gear shift stage in the "D" range, before the switching-over, is any of the first to third gear shift stages, the same gear shift stage is held in the "M" range after the switching-over. If the gear shift stage in the "D" range, before the switching-over, is the fourth gear shift stages, the third gear shift stage is established in the "M" range, after the switching-over. However, if an over revolution occurs, upon the establishment of the third gear shift stage, the fourth gear shift stage is established.

When the range has been switched over from the "2" range to the "M" range, even if the gear shift stage in the "2" range, before the switching-over, is any of the third and second gear Shift stages, the third gear shift stage is established in the "M" range, after the switching-over. However, when the range has been switched over from the "2" range to the "M" range, during stoppage of the vehicle, the first gear shift stage is established in the "M" range, after the switching-over.

Further, by operating the upshifting switch $S_7$, or the downshifting switch $S_8$, during stoppage of the vehicle, the first or second gear shift stage can be selected as a gear shift stage at the start of the vehicle.

The control of hydraulic pressure at the time of shifting will be explained with reference to FIGS. 6 to 11.

Figure 6:
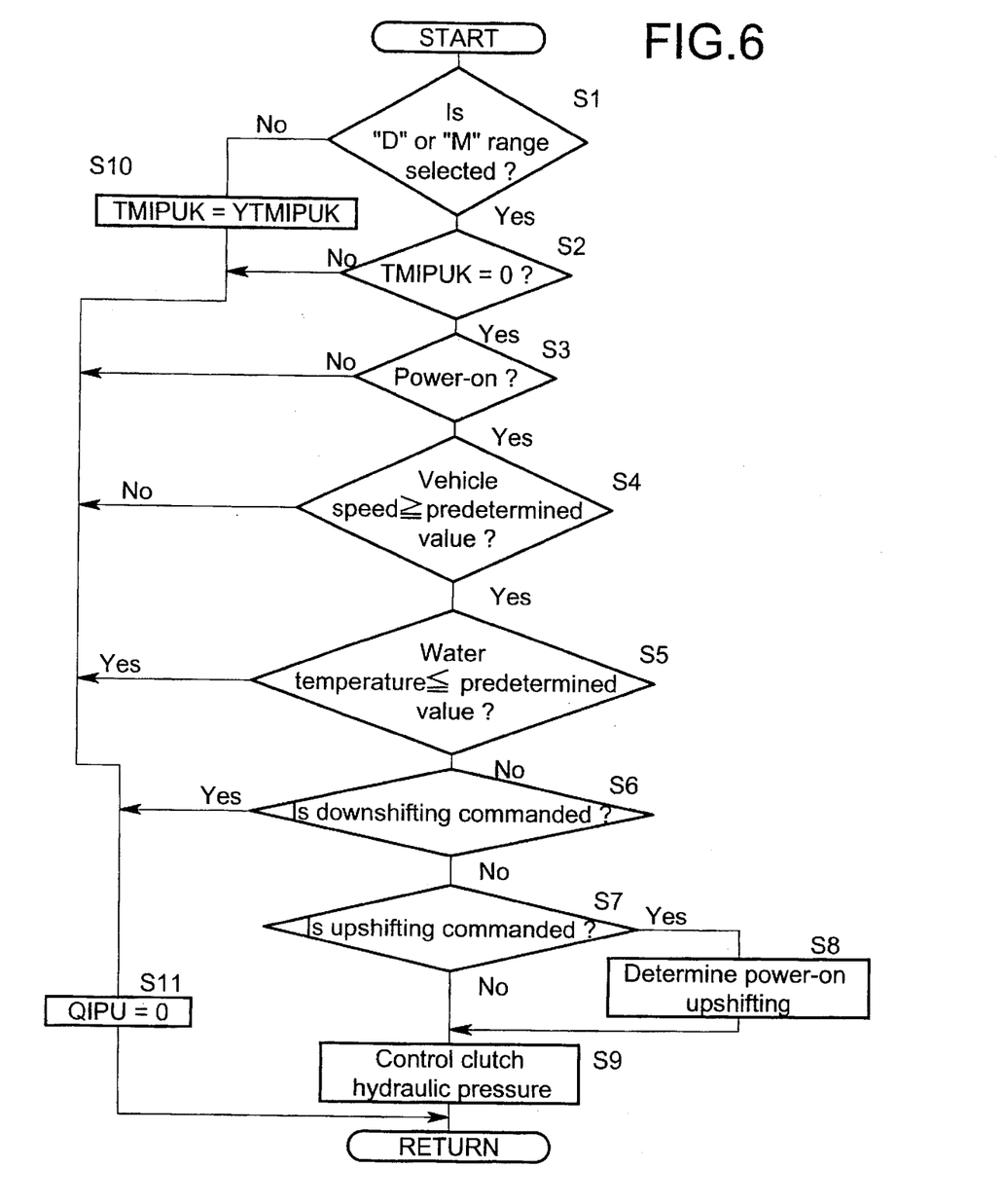
FIG. 6 is a flow chart of a clutch hydraulic pressure control preparing routine.

The flow chart in FIG. 6 illustrates conditions under which the control of hydraulic pressure according to the present invention is carried out. The control of hydraulic pressure which will be described hereinafter is carried out at step S9, if the following conditions (1) to (6) are satisfied at steps S1 to S6: (1) the "D" range or and the "M" range is selected at step S1; (2) a timer TMIPUK which will be described hereinafter has completed a counting-up at step S2; (3) the throttle opening degree TH detected by the throttle opening degree sensor $S_1$ is equal to or larger than a predetermined value at step S3; (4) the vehicle speed V detected by the vehicle speed sensor $S_9$ is greater than or equal to a predetermined value at step S4; (5) the cooling water temperature Tw is not less than or equal to a predetermined value at step S5; and (6) a downshifting is not commanded at step S6. At that time, if the upshifting is output in step S7, it is determined in step S8 that the upshifting should be power-on upshifting (i.e., an upshifting in a state in which the accelerator pedal has been depressed down to an extent greater than or equal to a predetermined value).

If the "D" range or the "M" range is not selected at step S1, i.e., if the "P" range, the "R" range, "N" range, the "2" range or the "1" range is selected at step S1, the timer TMIPUK is set. During counting by the timer TMIPUK, the answer at step S2 is NO. Therefore, even if the "D" range or the "M" range is selected, the control of hydraulic pressure at step S9 has not started, before a predetermined stable time (i.e., time to be counted by the timer TMIPUK) has lapsed.

If any of the conditions at steps S1 to S6 is not established, the control of hydraulic pressure at step S9 is not carried out, and a final output hydraulic pressure QIPU which will be described hereinafter is set at 0 (zero) (i.e., a value which is set in every gear shift stage and increased or decreased depending upon the throttle opening degree) at step S11.

Specific contents of the control of hydraulic pressure at the time of shifting will be described based on the time chart in FIG. 8.

Figure 8:
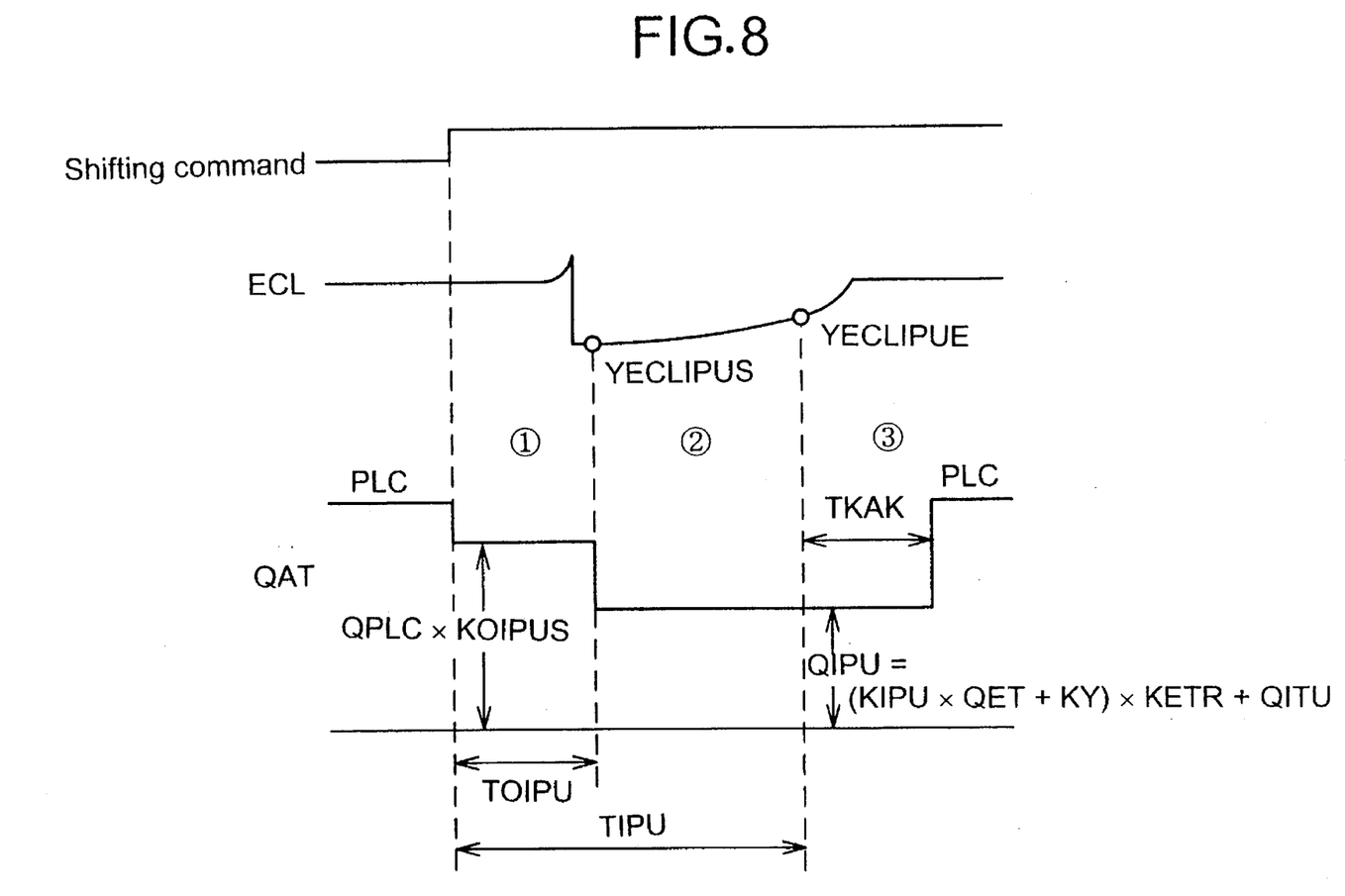
FIG. 8 is a time chart for explaining the operation.
Figure 9:
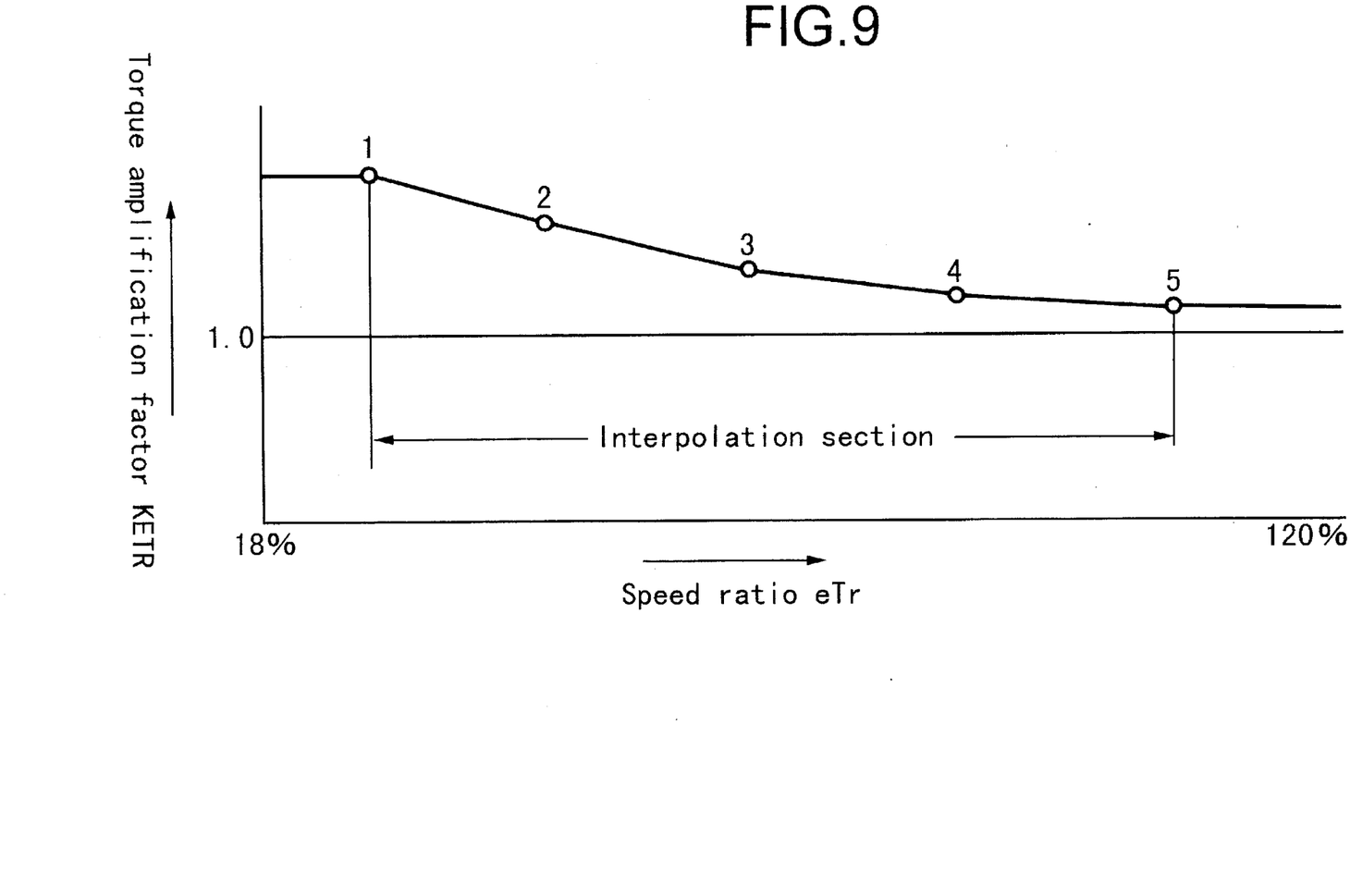
FIG. 9 is a graph illustrating the relationship between eTr and KETR.

As shown in FIG. 8, the control of hydraulic pressure is started when a shifting command is output. Different controls of hydraulic pressure are conducted in (1), (2) and (3) ranges. ECL is a slip rate of hydraulic engage elements which is a value provided by correcting the detection values detected by the main shaft revolution-number sensor $S_3$ and the counter shaft revolution-number sensor $S_4$, by using gear ratios before and after a shifting. In a condition in which the shifting is substantially not started and there is not slipping, the slip rate is approximately 1.0. Upon the start of the substantial shifting, the slip rate begins to be varied. At the same time, a gear ratio before the shifting is exchanged to a gear ratio after the shifting and hence, the slip rate is largely decreased from 1.0 and thereafter, converges to or approaches 1.0 with the advance of the shifting. Therefore, the advancing state of the shifting can be grasped based on the value of the slip rate.

The control of hydraulic pressure in the (1) range is started concurrently with the commanding of the shifting, and completed when either one of the following conditions is established: a condition that a response pressure outputting timer TOIPU set concurrently with the start of the control of hydraulic pressure reaches a counting-up value; and a condition that the slip rate ECL exceeds a threshold value YECLIPUS.

In the (1) range, an output hydraulic pressure QIPU is calculated by multiplying a factor KOIPUS previously set depending upon the type of shifting to a hydraulic pressure QPLC also previously set depending upon the type of shifting according to the following equation:

$$QIPU=QPLC \times KOIPUS \qquad (1)$$

A command value QAT for a solenoid valve such as a linear solenoid as a duty solenoid for controlling the operating hydraulic pressure for the hydraulic engage elements is determined in accordance with the value of such output hydraulic pressure QIPU.

The control of hydraulic pressure in the (2) range is started concurrently with the commanding of the completion of the control of hydraulic pressure in the (1) range, and completed when either one of the following conditions is established: a condition that a hydraulic pressure control timer TIPU is set concurrently with the commanding of the shifting reaches a counting-up value; and a condition that the slip rate ECL exceeds a threshold value YECLIPUE.

In the (2) range, an output hydraulic pressure QIPU according to a current engine torque is calculated, and a command value QAT for the solenoid valve is determined in accordance with the calculated value of the output hydraulic pressure QIPU. How the output hydraulic pressure QIPU hydraulic pressure QPLC according to a current engine torque is determined will be described below with reference to FIGS. 9 to 11.

First, an engine torque QET is searched from a map, using as parameters, a number of revolution Ne of the engine detected by the engine revolution sensor $S_2$ and an intake pipe negative pressure Pb defected by the intake pipe negative pressure sensor $S_{10}$. Then, a speed ratio eTr of the torque converter 2 is calculated from the number of revolution Ne of the engine detected by the engine revolution sensor $S_2$ and the main shaft revolution-number Nm detected by the main shaft revolution-number sensor $S_3$ mounted on the main shaft MS. This speed ratio eTr is applied to the graph in FIG. 9 to calculate a torque amplification factor KETR. The torque amplification factor KETR is gradually decreased from a value larger than 1 toward 1 in accordance with an increase in speed ratio eTr.

Figure 10:
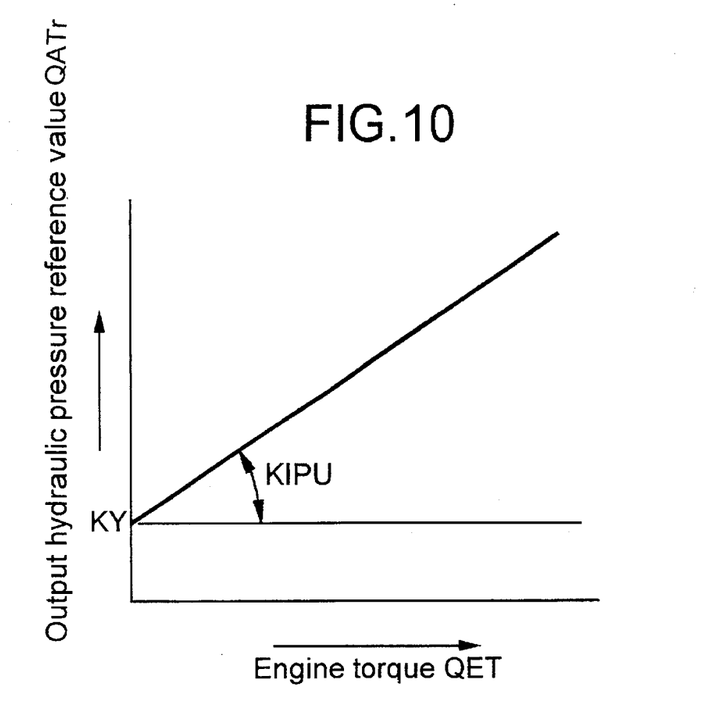
FIG. 10 is a graph illustrating the relationship between QET and QATr.

Further, the engine torque QET is applied to the graph in FIG. 10 to calculate an output hydraulic pressure reference value QATr. The output hydraulic pressure reference value QATr is represented by a linear function of the engine torque QET, wherein an intercept is given by KY, and the inclination thereof is given by KIPU. Therefore, the output hydraulic pressure reference value QATr is calculated according to QATr=KIPU×QET+KY.

Figure 11:
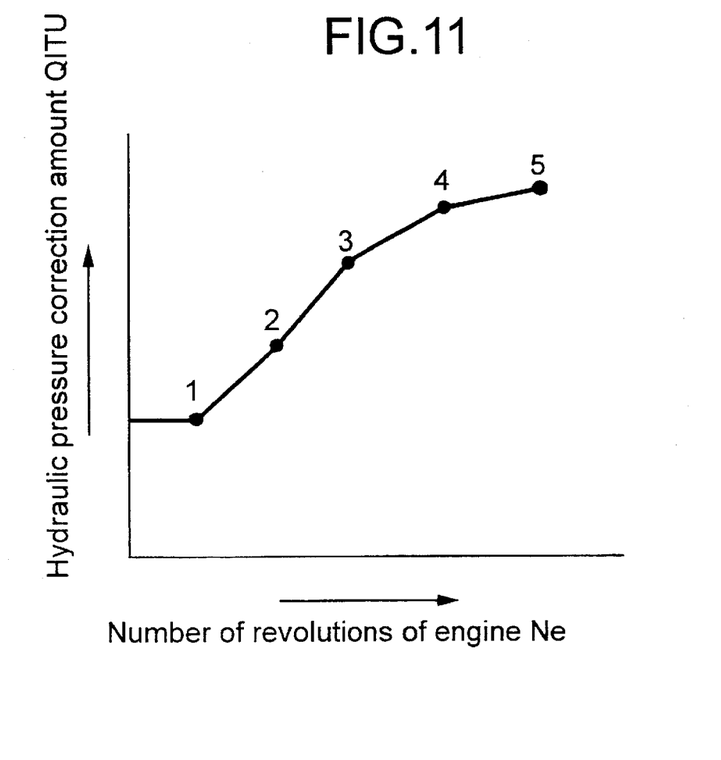
FIG. 11 is a graph illustrating the relationship between Ne and QITU.

Further, the engine revolution number Ne detected by the engine revolution number sensor $S_2$ is applied to the graph in FIG. 11 to calculate a hydraulic pressure correction quantity QITU. The hydraulic pressure correction quantity QITU is used to correct the influence of a centrifugal force acting on a working oil within an oil chamber for the hydraulic engage elements, and the value of the hydraulic pressure correction quantity QITU is determined so as to increase in accordance with an increase in engine revolution number Ne.

The output hydraulic pressure QIPU in the (2) range is calculated according to $$QIPU=QATr \times KETR+QITU=(KIPU \times QET+KY) \times KETR+QITU \qquad (2)$$

using the inclination KIPU, the engine torque QET, the intercept KY, the torque amplification factor KETR, the output hydraulic pressure reference value QATr and the hydraulic pressure correction quantity QITU.

The control of hydraulic pressure in the (3) range is started concurrently with the completion of the control of hydraulic pressure in the (2) range, and completed concurrently with the counting-up by a hydraulic pressure control restoration timer TKAK. The output hydraulic pressure QIPU in the (3) range is determined at the same value as in the (2) range.

As described above, in the (1) range from the output of the upshifting command in a power-on state to the start of the substantial shifting, the output hydraulic pressure QIPU (see equation (1)) previously set depending upon the type of shifting is output. In the (2) and (3) ranges from the start to the completion of the substantial shifting, the output hydraulic pressure QIPU (see the equation (2)) calculated in accordance with the engine torque is output. In this way, an optimal engage force according to the current operational state of the vehicle can be provided to effectively improve the shifting characteristic, particularly during the power-on upshifting which may be accompanied by the problem of generation of a shifting shock.

Figure 7:
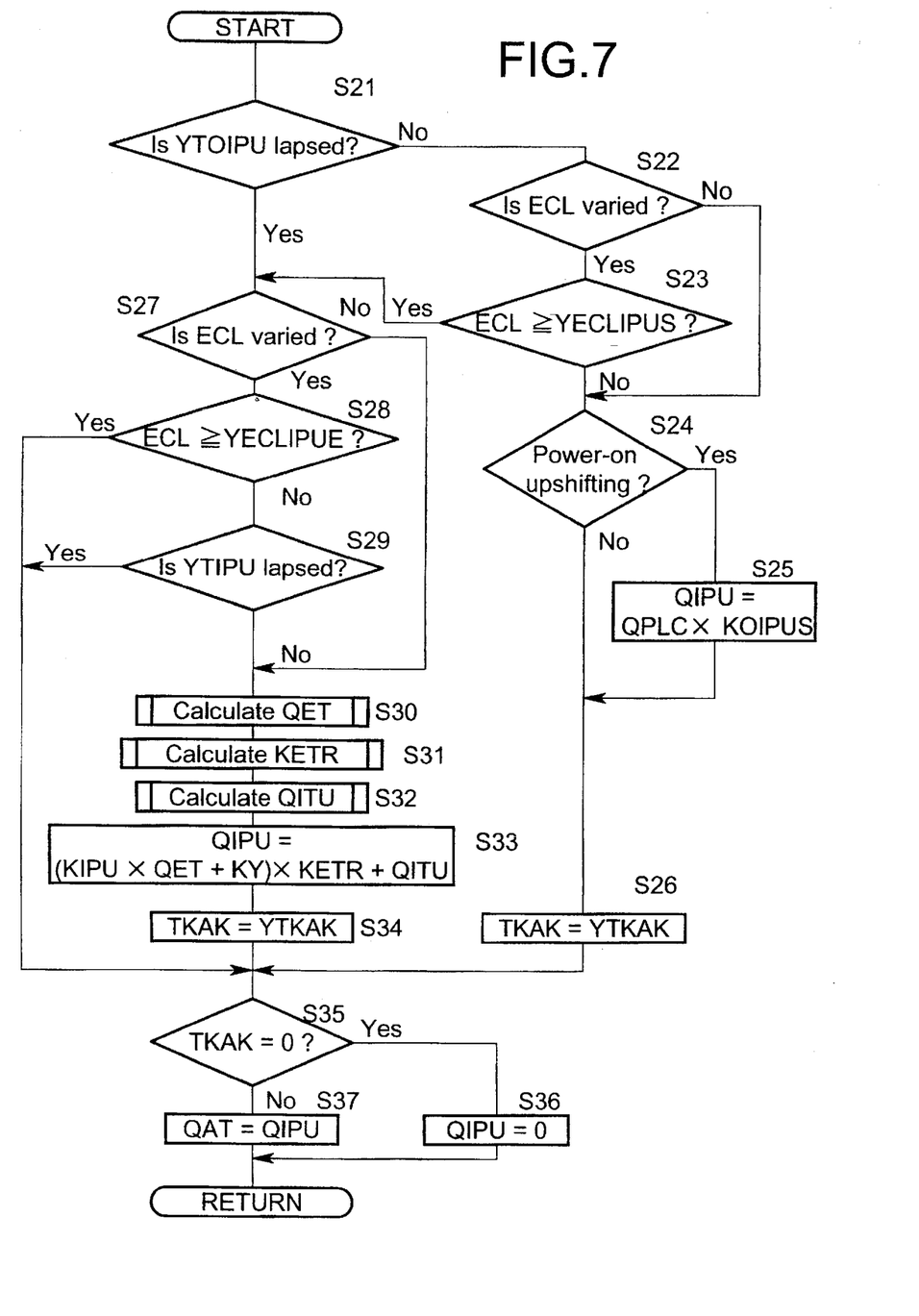
FIG. 7 is a flow chart of a clutch hydraulic pressure control routine.

The operation will be further described with reference to the flow chart in FIG. 7.

If the answer at step S21 is NO to indicate that the response pressure output timer TOIPU does not reach the counting-up value, and if the answer at step S22 is YES and the answer at step S23 is NO to indicate that the slip rate ECL is not increased up to the threshold value YECLIPUS, it is determined that the timing is in the (1) range in FIG. 8. If the shifting is a power-on upshifting at step S24, an output hydraulic pressure QIPU is calculated according to the equation (1), and a command value QAT for the solenoid valve according to the value of the output hydraulic pressure QIPU is determined at step S37.

If the answer at step S21 is YES to indicate that the response pressure outputting timer TOIPU reaches the counting-up, or if the answer at step S23 is YES to indicate that the slip rate ECL becomes equal to or larger than the threshold value YECLIPUS, it is determined that the timing has entered the (2) range. Thereupon, an output hydraulic pressure QIPU is calculated according to the equation (2) at steps S30 to S33, and a command value QAT for the solenoid valve according to the value of the output hydraulic pressure QIPU is determined at step S37.

If the answer at step S28 is YES to indicate that the slip rate ECL becomes equal to or larger than the threshold value YECLIPUS, or if the answer at step S29 is YES to indicate that the hydraulic pressure control timer TIPU has reached the counting-up value, it is determined that the timing has entered the (3) range in FIG. 8. The hydraulic pressure control restoration timer TKAK is set at step S26 or S33 in each hitherto loop starts the counting. Until the hydraulic pressure control restoration timer TKAK reaches the counting-up value at step S35, a command value QAT for the solenoid valve according to the same output hydraulic pressure QIPU as in the (2) range is determined at step S37.

If the answer at step S35 is YES to indicate that the hydraulic pressure control restoration timer TKAK has reached the counting-up value, it is determined that the (3) range has been completed, and the output hydraulic pressure QIPU is restored to 0 (i.e., the value which is set in every gear shift stage and increased or decreased in proportion to the throttle opening degree) at step S36.

Figure 12:
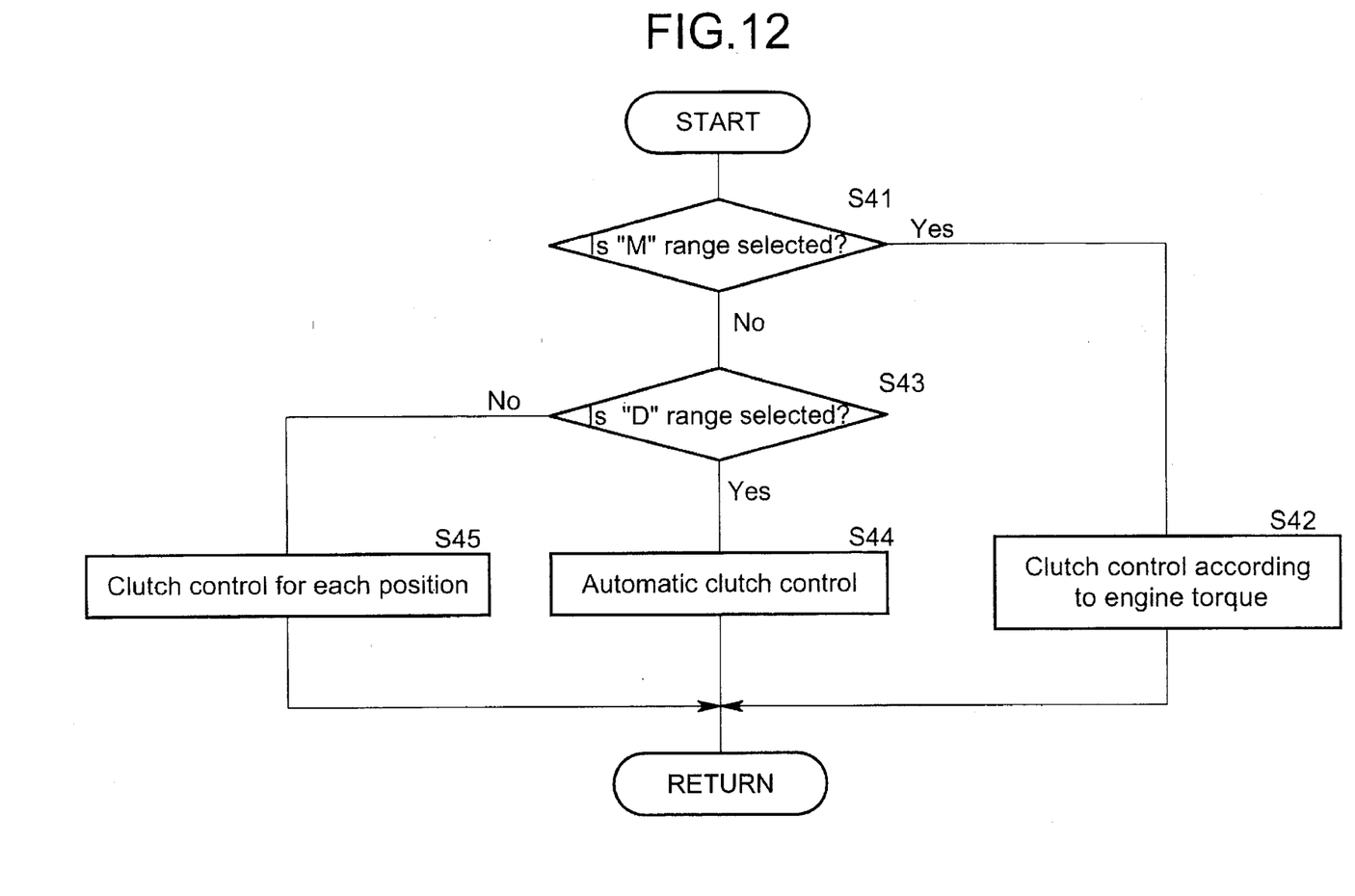
FIG. 12 is a flow chart according to a second embodiment.

A second embodiment of the present invention will be described below with reference to a flow chart in FIG. 12.

In the first embodiment, in both the cases where the "D" range is selected and where the "M" range is selected, the operating hydraulic pressure for the hydraulic engage elements is set at the value corresponding to the engine torque, but in the second embodiment, only when the "M" range is selected, the operating hydraulic pressure for the hydraulic engage elements is set at the value corresponding to the engine torque.

More specifically, if the "M" range is selected at step S41, the clutch control similar to that in the first embodiment and depending upon the engine torque is carried out at step S42. If the "D" range is selected at step S43, the clutch control is carried out based on the hydraulic pressure characteristic previously established at step S44. If the "D" range is not selected at step S43, i.e., if the range other than the "M" range or the "D" range is selected, the clutch control is carried out based on the hydraulic pressure characteristic previously established for such range.

In the second embodiment, in the "M" range in which the driver outputs a shifting command at any time, an optimal hydraulic pressure suitable for the current operational state of the vehicle can be applied to the hydraulic engage elements to alleviate the shifting shock.

Although the embodiments of the present invention have been described in detail, it will be understood that the present invention is not limited to the above-described embodiments, and various modifications in design may be made without departing from the spirit and scope of the invention defined in claims.

For example, the input torque to the gear shifting mechanism of the automatic transmission T is given by KETR x τxNe$^2$, based on the torque amplification factor KETR, a torque capacity factor τ, and the engine revolution number Ne. Therefore, it is possible to determine an output hydraulic pressure QIPU in a manner similar to the equation (2) by previously establishing the input torque and the output hydraulic pressure in a relationship as shown in FIG. 10.

As discussed above, according to of the present invention, the hydraulic pressure applied to the hydraulic engage elements at the time of shifting is established based on the engine torque and the transmission input torque and therefore, it is possible to provide a good shifting characteristic with less increase in number of revolutions of the engine and less shifting shock.

Furthermore, according to the present invention, it is also possible to effectively improve the shifting characteristic, particularly in the power-on upshifting which may be accompanied by the problem of the generation of a shifting shock.

We claim:

1. A control system for an automatic transmission for a vehicle, which is capable of selecting automatic and manual shifting modes, comprising:

a vehicle speed detecting means for detecting a value corresponding to a vehicle speed;

an engine load detecting means for detecting a value corresponding to an engine load;

an automatic shifting mode capable of controlling a transmission gear ratio based on outputs from said vehicle speed detecting means and said engine load detecting means, and based on a previously established shifting characteristic;

a shifting command means for outputting a shifting command for shifting to a predetermined transmission gear ratio by a manual operation;

a manual shifting mode for conducting a shifting based on an operation of the shifting command means;

a plurality of hydraulic engage elements for establishing a transmission gear ratio selected in each of said automatic shifting mode or said manual shifting mode; and a control means for controlling a hydraulic pressure of a working oil supplied to said hydraulic engage elements, wherein said control means establishes a hydraulic pressure of said working oil based on an engine output torque or a transmission input torque, at the time of shifting in a state in which at least the manual shifting mode has been selected.

2. A control system for an automatic transmission for a vehicle according to claim 1, wherein there is power-on upshifting at said time of shifting.

3. A control system for an automatic transmission for a vehicle, which is capable of selecting automatic and manual shifting modes, comprising:

a vehicle speed detecting means for detecting a value corresponding to a vehicle speed;

an engine load detecting means for detecting a value corresponding to an engine load;

an automatic shifting mode capable of controlling a transmission gear ratio based on outputs from said vehicle speed detecting means and said engine load detecting means, and based on a previously established shifting characteristic;

a shifting command means for outputting a shifting command for shifting to a predetermined transmission gear ratio by a manual operation;

a manual shifting mode for conducting a shifting based on an operation of the shifting command means;

a plurality of hydraulic engage elements for establishing a transmission gear ratio selected in each of said automatic shifting mode or said manual shifting mode; and a control means for controlling a hydraulic pressure of a working oil supplied to said hydraulic engage elements, wherein said control means establishes a hydraulic pressure of said working oil based on a preset value at the time of shifting in a state in which said automatic shifting mode has been selected, and said control means establishes a hydraulic pressure of said working oil based on an engine output torque or a transmission input torque at the time of shifting in a state in which said manual shifting mode has been selected.

4. A control system for an automatic transmission for a vehicle according to claim 3, wherein there is power-on upshifting at said time of shifting.

* * * * *